United States Patent [19]

Al-Ani

[11] Patent Number: 5,214,459
[45] Date of Patent: May 25, 1993

[54] OVERHEAD PROJECTORS

[75] Inventor: Tarik Al-Ani, Nurmijärvi, Finland

[73] Assignee: Educatek Oy, Finland

[21] Appl. No.: 778,967

[22] PCT Filed: Jun. 28, 1989

[86] PCT No.: PCT/FI89/00124

§ 371 Date: Dec. 27, 1991

§ 102(e) Date: Dec. 27, 1991

[87] PCT Pub. No.: WO91/00546

PCT Pub. Date: Jan. 10, 1991

[51] Int. Cl.5 .............................................. G03B 23/12
[52] U.S. Cl. ........................................ 353/88; 353/97; 353/DIG. 3; 353/98
[58] Field of Search ................... 353/120, 98, 63, 88, 353/97, DIG. 3, DIG. 4, DIG. 5, 122

[56] References Cited

U.S. PATENT DOCUMENTS

| | | |
|---|---|---|
| 3,213,750 | 10/1965 | Eggert . |
| 3,531,193 | 9/1970 | Diehl . |
| 3,661,449 | 5/1972 | Wright .................... 353/88 |
| 3,785,729 | 1/1974 | Dasher et al. ............. 353/DIG. 5 |
| 4,652,101 | 3/1987 | Grunwald .................. 353/122 |
| 4,942,411 | 7/1990 | Polston .................... 353/DIG. 5 |
| 4,944,586 | 7/1990 | Rightmyre ................. 353/DIG. 5 |
| 5,052,798 | 10/1991 | Mardis .................... 353/88 |

FOREIGN PATENT DOCUMENTS

| | | |
|---|---|---|
| 0058363 | 8/1982 | European Pat. Off. . |
| 2156275 | 5/1973 | Fed. Rep. of Germany . |
| 3138231 | 8/1982 | Fed. Rep. of Germany . |
| 3205642 | 8/1983 | Fed. Rep. of Germany . |
| 3208723 | 9/1983 | Fed. Rep. of Germany . |
| 3233257 | 3/1984 | Fed. Rep. of Germany . |
| 3425323 | 1/1986 | Fed. Rep. of Germany . |
| 348564 | 9/1972 | Sweden . |
| 371504 | 11/1974 | Sweden . |
| 513423 | 11/1971 | Switzerland . |
| 1431542 | 4/1976 | United Kingdom . |
| 89/02096 | 3/1989 | World Int. Prop. O. . |

Primary Examiner—William A. Cuchlinski, Jr.
Assistant Examiner—William C. Dowling
Attorney, Agent, or Firm—Andrus, Sceales, Starke & Sawall

[57] ABSTRACT

The objective of the invention is an overhead projector (1) supplied with acetate film rolls (4), to which projector belongs a body (2) onto which is fixed a projection arm (16) equipped with a lens/lenses (21) and a flat mirror (20). The body (2) is supplied with an openable top part (3) into which roll spaces are arranged for the acetate film rolls (4). The acetate film rolls (4) are installed on axle rods (26) which are supplied with rotating cylinders (5) and mounted in the top part (3) at opposite ends in the shaped spaces with the aid of a bent spring and fixing hole. In the inner side of the body (2) is also arranged at least one shutter screen element (10-13) that stays inside the body (2) in all cases of use, and which is installed to cover the projected part of the acetate film (6) fully or partially. The screen elements are moved in a flat level on guiding rods (15) inside the body (2) in the directions of the length and/or width of the body (2) with the help of levers (14).

7 Claims, 5 Drawing Sheets

OVERHEAD PROJECTORS

The objective of this invention is an overhead projector (OHP) fitted with an acetate film roll, which consists of a body and its relevant projection arm fitted with a lens or lenses and a mirror.

In the existing OHP's, the acetate film rolls are usually assembled as extra elements onto fixed holders. These holders are usually fixed onto the body of the projector. One disadvantages of fixing the acetate film rolls in this conventional way is that when it is necessary to perform maintenance work, like changing a lamp, it is necessary to take the rolls off before being about to open the top and have access to the inside of the body. There is a further problem in the conventional OHP's and that is that when there is a need to cover part of the projected image, like in lectures and demonstrations, this is done by using extra sheets of paper or equivalent on top of the image. This makes the use of the OHP quite clumsy.

The main objective of the invention being presented is to decrease or eliminate the above causes of problems or disadvantages, and generally to improve the usefulness of the OHP. In order to implement the main objectives of the invention, the items presented in the patent claim 1 are characterized of the OHP.

The invention is shown in relation to the enclosed drawings as follows.

Figure 1:
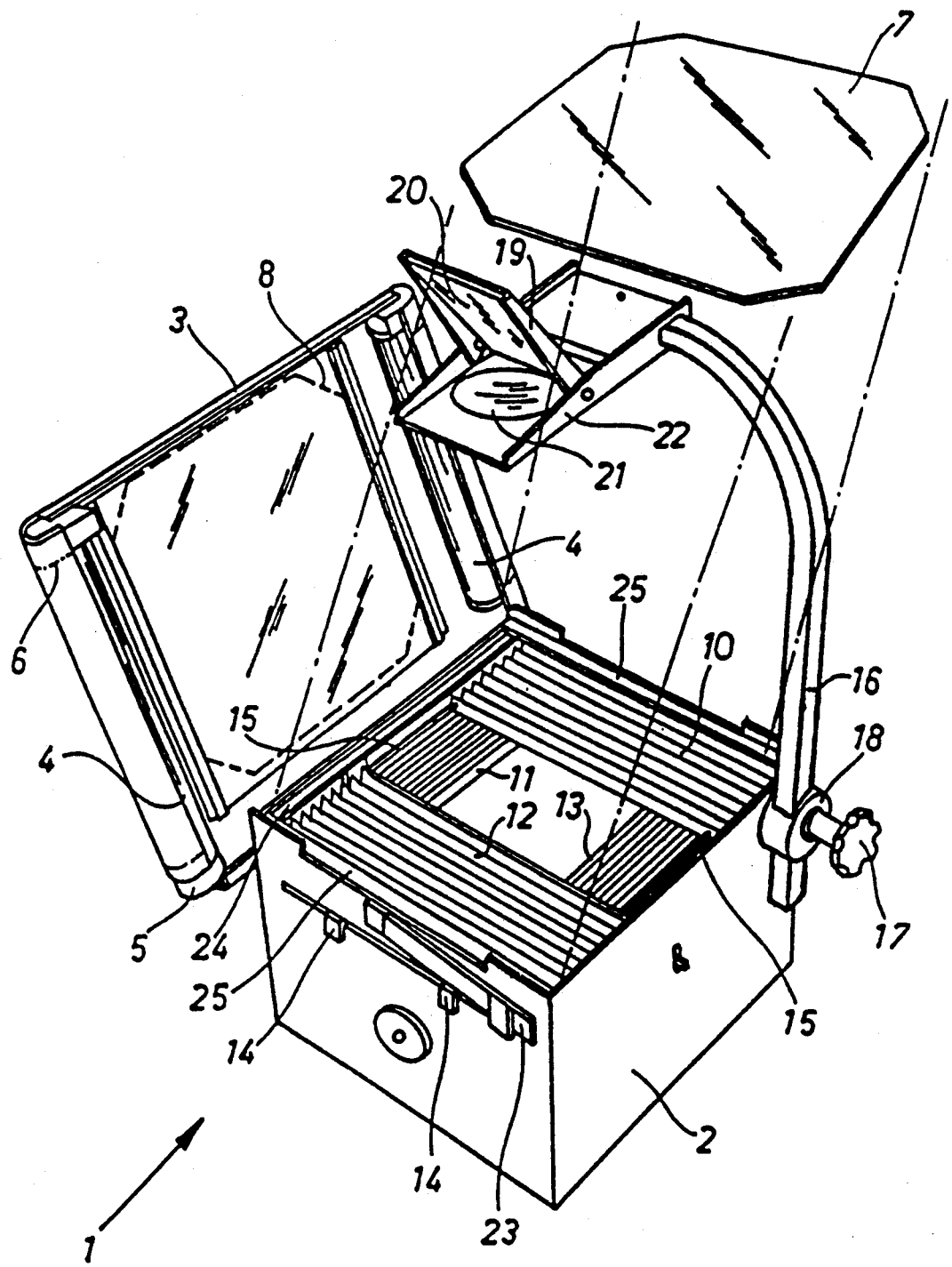
FIG. 1 shows the OHP, according to the invention, open and presented in a perspective view.
Figure 2:
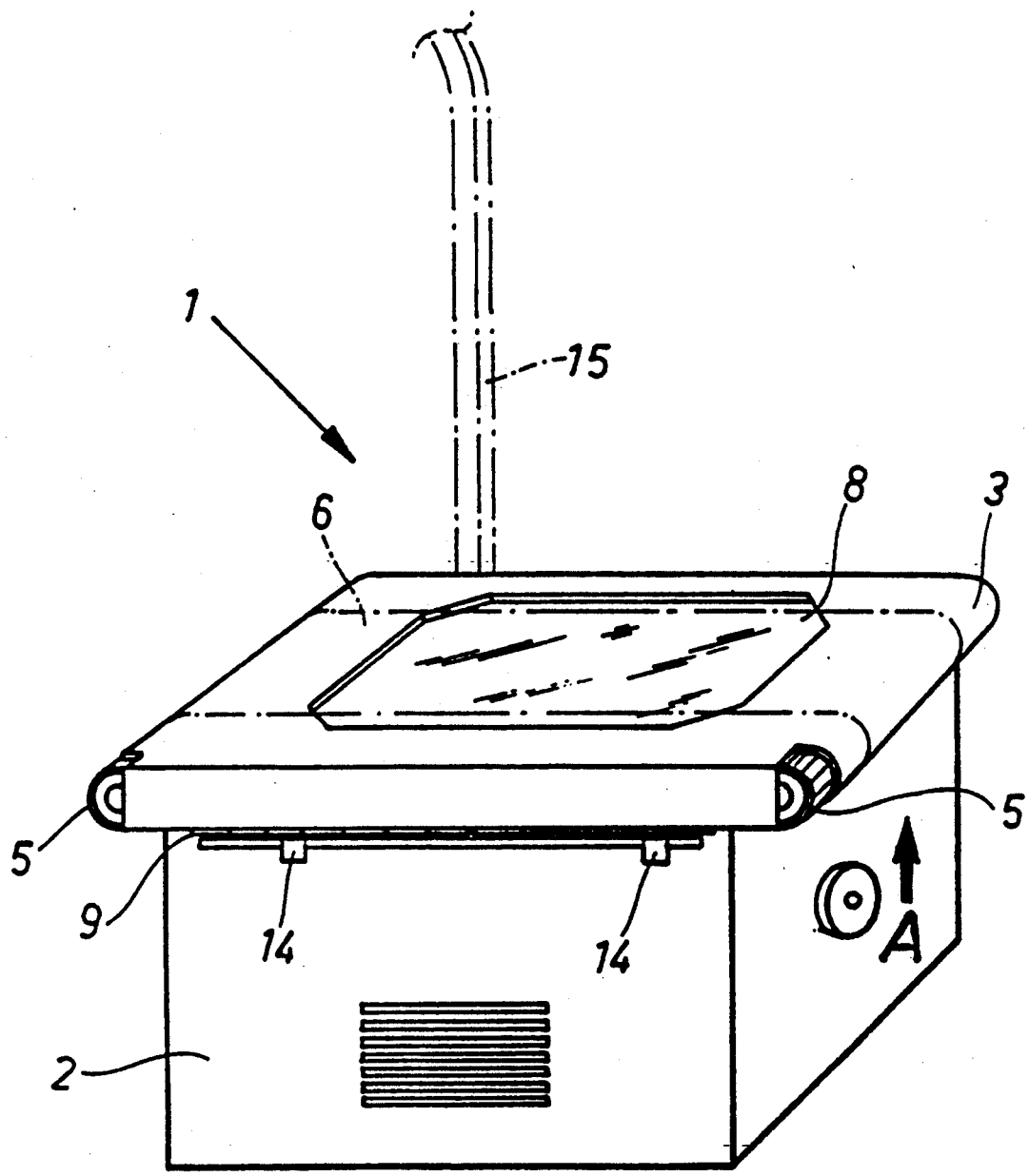
FIG. 2 shows the OHP, according to the invention, closed and presented in a perspective view.
Figure 3:
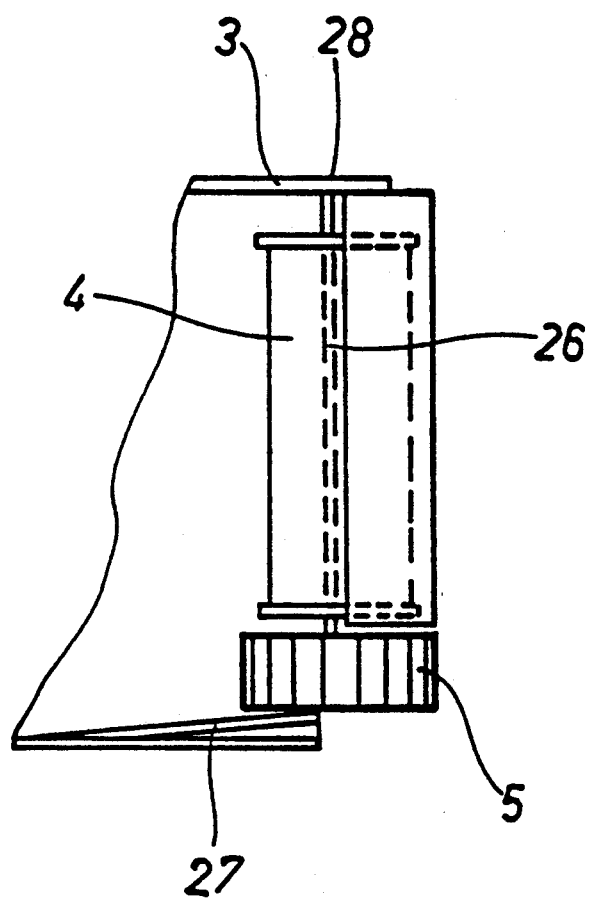
FIG. 3 shows some features of the OHJP, according to the invention, viewed from FIG. 2, arrow A.
Figure 4:
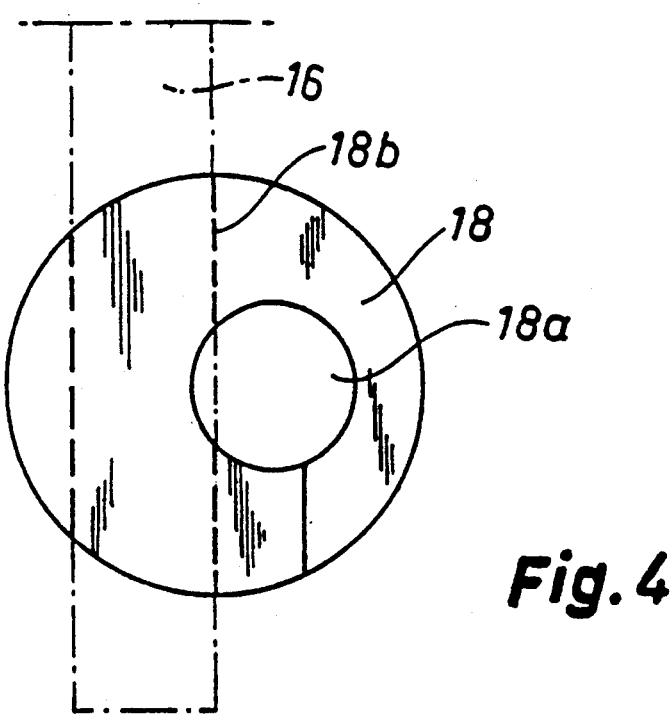
FIGS. 4 and 5 shows, according to the invention, the OHP's projection arm, with its fixing base and moving knob seen from front and top.
Figure 5:
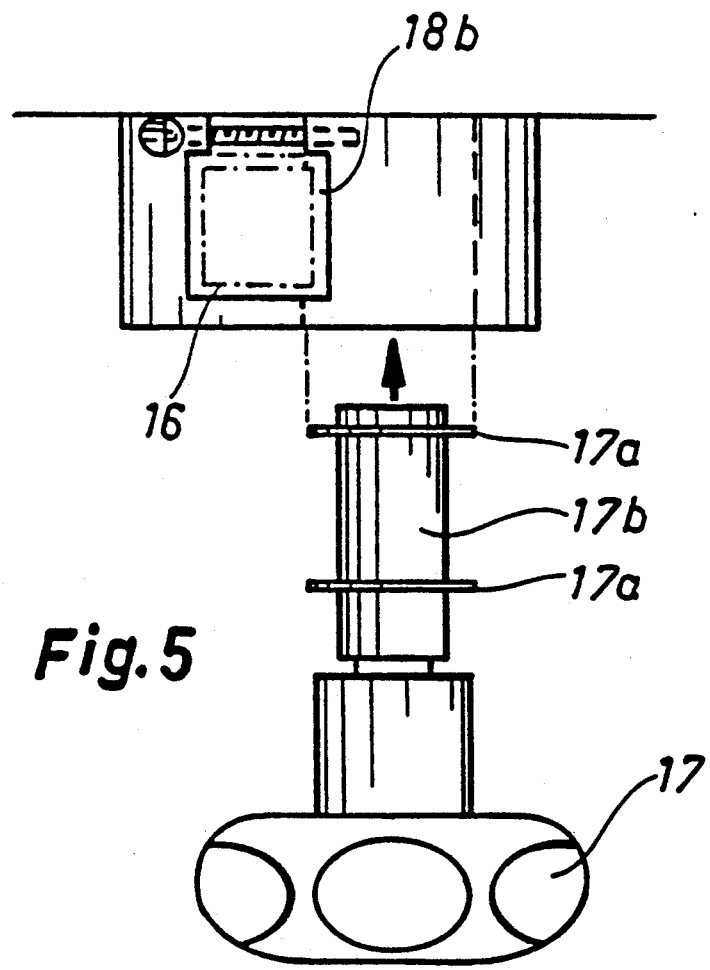

According to FIG. 1 and 2, the OHP consists of a body 2, which is supplied with an openable top part 3. Onto the body 2 is also connected a projection arm 16 with the help of a fixing base 18 and the moving knob 17. The top part of the projection arm 16 is made of a base unit 22, lens/lenses 21 and a flat mirror 20 on a holder 19. The openable top part 3 is supplied with a glass plate 8 with its holder and the acetate film rolls 4 with their holders. According to FIG. 3, the acetate film rolls are installed on axle rods 26, which are supplied from one end with rotating cylinders 5. The acetate film rolls 4, which are installed on the axle rods 26, are mounted in the openable top part 3 at opposite ends in the shaped spaces with the help of a bent spring 27 and fixing hole 28. The roll space is spaced so that when the top part 3 is in the closed position, the acetate film rolls 4 can be rotated from the rotating cylinder 5. The openable top part 3 is fixed to the body 2 with a hinge 9.

Figure 6:
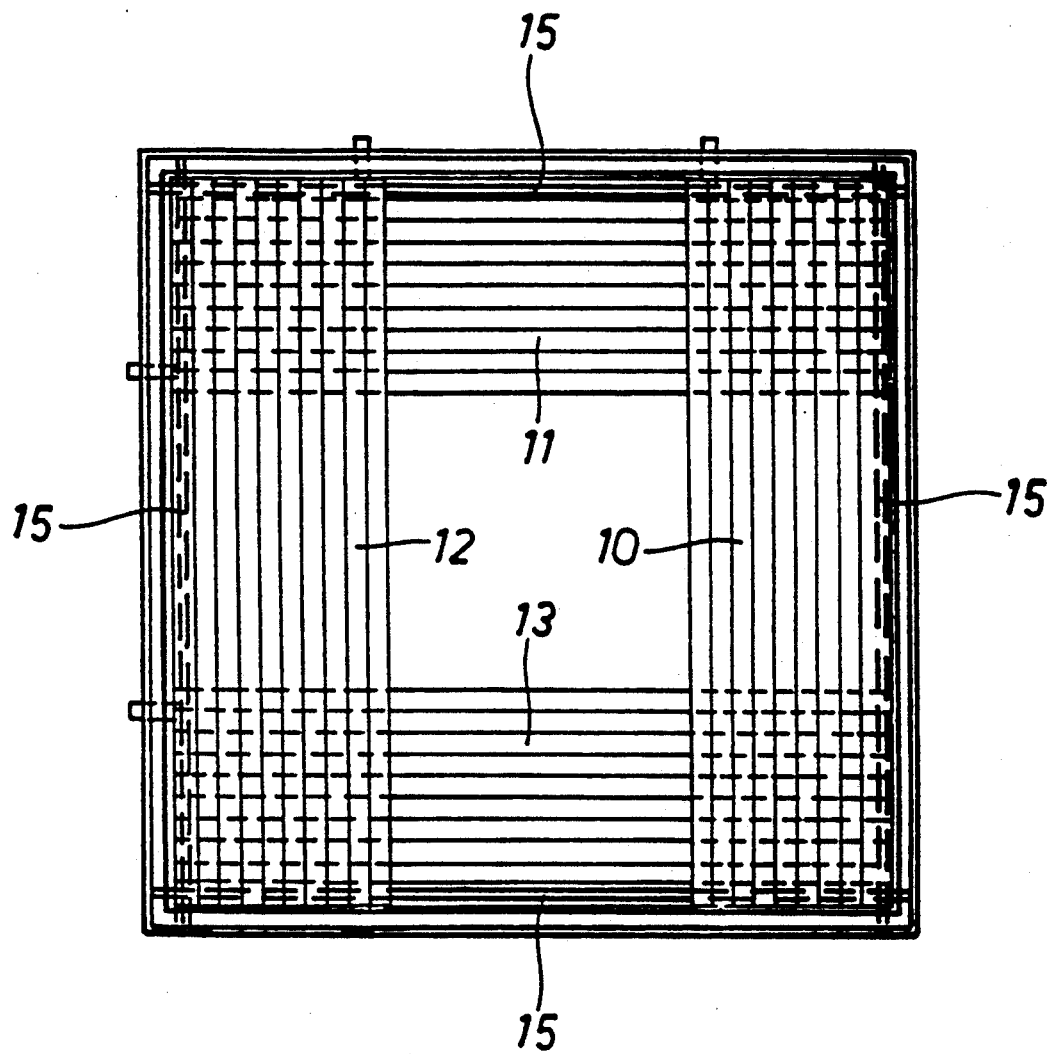
FIG. 6 shows some details of the invention seen from the top.

In the inner part of the body 2 is arranged four shutter screens 10–13 advantageously. The screens can be moved in a flat level with guiding rods situated in the inner side of the body 2 on all four sides so that the screens 10–13 stay, in all cases of use, inside the body 2. According to FIGS. 1 and 6, the form of operation of screens 10 and 12 is such, that they move in the same direction as the movement of the acetate film, while screens 11 and 13 move in a direction perpendicular to that of the movement of the acetate film. Each of the shutter screens 10–13 is so arranged that it can, when needed, cover all the area of the image being projected. The shutter screens 10–13 are moved with the help of the levers 14, which are easily situated in two adjacent sides of the body 2 of the OHP 1. In the inside of the body 2 is also installed a Fresnel lens 7 between the edge rims 26 and 24. The openable top part 3 is locked with the aid of the locking unit 23.

The projection arm 16 is a square section aluminum tube whose top part is bent so that the base unit 22 is always maintained in a level exactly parallel to the glass plate 8. The projection arm 16 is fixed to the body 2 with the fixing base 18. The fixing base 18 is a cylindrically shaped plastic piece into which is cut a vertical hole 18b of the same square section of the projection arm 16, and in the other direction is cut a cylindrical hole 18a perpendicular to the square section hole. The fixing base 18 is itself fixed to the body 2 by screws or rivets. The moving knob 17 consists of a cylindrical part 17b and a rim 17a, to be inserted into hole 18a. Between these rims 17a, the projection arm 16 is situated.

By turning the moving knob 17, the projection arm 16 moves vertically.

According to the invention, the OHP is also supplied with an electronic circuit which measures the light condition in the room and adjusts the intensity of the lamp of the OHP 1 accordingly. The light intensity needed in a dark room from the lamp of the OHP 1 is less than that in a lit room, and in this case the light intensity of the lamp can be decreased, thus extending the life of the lamp noticeably.

In order to improve the moving, storage and handling of the OHP, a retracting power cable is installed in the OHP.

I claim:

1. An overhead projector (1) comprising:

a box-like body (2) having an openable top part (3) with a window through which light projection may occur;

a projection (16) arm mounted on said body and equipped with at least one lens (21) and a mirror (20) for receiving the light projecting through said window;

transparent film rolls (4) at opposing ends of said top part and having a transparent film extending between said rolls and across said window so that information on said film appearing in said window may undergo projection; said top part being formed to receive and retain said rolls in appropriately shaped spaces at the opposing ends of said top part, each of said rolls having an axle (26) at one end and an axially extending cylindrical end portion (5) by which said roll can be manually rotated, each of said axles being located in a hole (28) in said top part for rotatably mounting said rolls in said spaces, said other ends of said rolls being biased by bent springs (27); and shutter screen means mounted inside said box-like body and capable of blocking at least a portion of said window, said shutter screen means comprising two pairs of opposing shutters (10,12; 11,13), the shutter of each pair being movable toward and away from each other along paths lying generally parallel to said window on guide rods (15) provided in said body; said shutter screen means having handles (14) coupled to said shutters and extending outside said body along two sides thereof for moving said shutters.

2. An overhead projector, according to claim 7, wherein said projection arm (16) has a smooth exterior, and wherein said projection arm is mounted on said body by means of a fixing element (18, 18a, 18b) affixed to said body and embracing said projection arm, and a moving element (17, 17a, 17b) rotatably mounted in said fixing element and frictionally engaging said projection arm.

3. An overhead projector, according to claim 2, characterized in that the projection arm (16) is square in cross section.

4. An overhead projector, according to claim 2, characterized in that the material of the projection arm (16) is aluminum or aluminum alloy.

5. An overhead projector according to claim 1, including a lamp in said box-like body and means for sensing the ambient light conditions in which said overhead projector is used and adjusting the intensity of said lamp accordingly.

6. An overhead projector according to claim 1, characterized in that the overhead projector (1) is provided with a retracting power cable.

7. An over projector according to claim 3, characterized in that the material of the projection arm (16) is aluminum or aluminum alloy.

* * * * *

UNITED STATES PATENT AND TRADEMARK OFFICE
CERTIFICATE OF CORRECTION

PATENT NO. : 5,214,459
DATED : May 25, 1993
INVENTOR(S) : Tarik Al-Ani

It is certified that error appears in the above-identified patent and that said Letters Patent is hereby corrected as shown below:

CLAIM 2, Col. 3, Line 1, delete "7" and substitute therefor ---1---; CLAIM 7, Col. 4, Line 12, delete "over" and substitute therefor ---overhead---.

Signed and Sealed this

Fourth Day of January, 1994

BRUCE LEHMAN

Attest:

Attesting Officer

Commissioner of Patents and Trademarks